March 4, 1930.    A. UHL ET AL    1,749,725
CONDUIT SUPPORT
Filed March 10, 1924
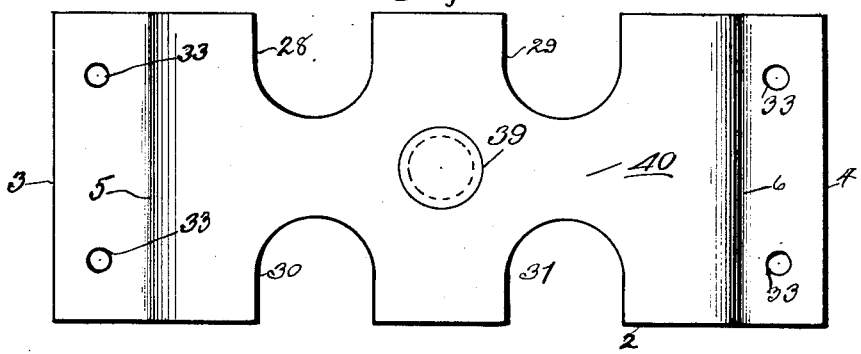
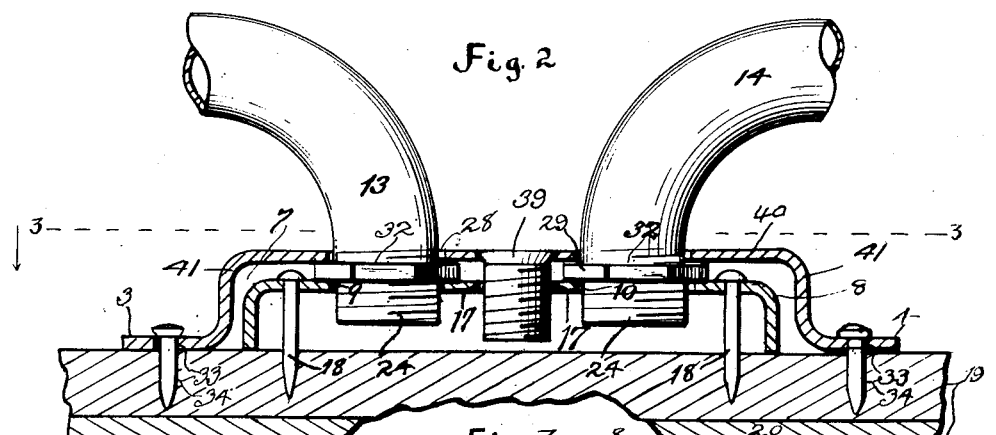
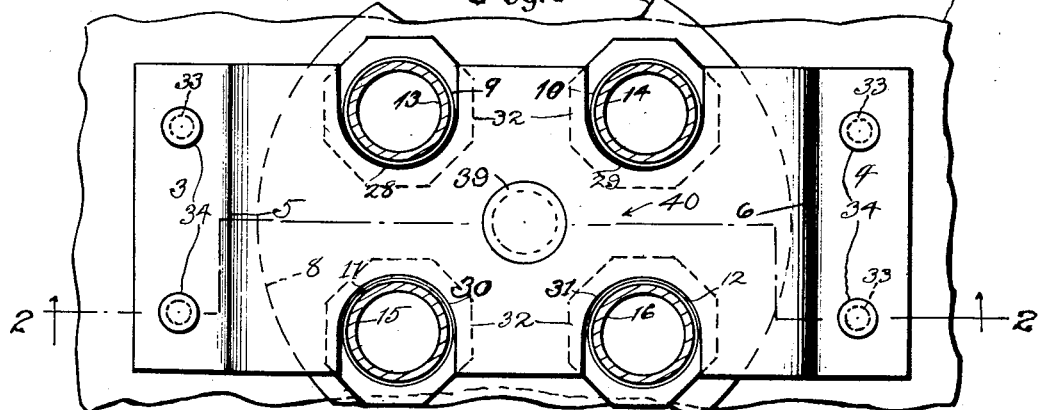
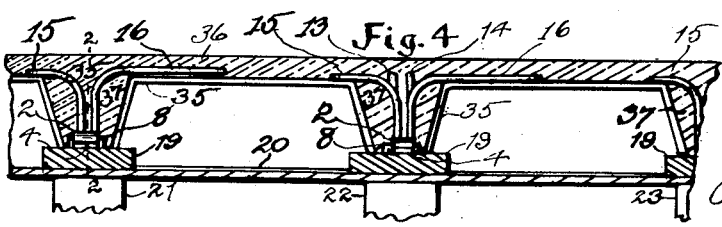
Inventors:
Albert Uhl
Peter E. Brickie
Attorney Patented Mar. 4, 1930

1,749,725

UNITED STATES PATENT OFFICE

ALBERT UHL AND PETER E. BRICKIE, OF CHICAGO, ILLINOIS.

CONDUIT SUPPORT

Application filed March 10, 1924. Serial No. 698,080.

Our invention relates to means for facilitating the proper installation of conduits leading into outlet boxes, the general object of our invention being that of providing means for maintaining conduits properly disposed in relation to an outlet box until the box and the conduits are imbedded in concrete, without requiring an anchoring of the conduits to the outlet box from inside the box.

In a further pertinent object, our invention provides simple and easily manipulated means which will permit a ceiling outlet box to be disposed in its desired position on a part of the temporary form upon which concrete is to be poured, and which will effect an anchoring of conduits to the outlet box without requiring the initially positioned outlet box to be lifted off the form and without requiring any manipulation inside the box or below the form. For this purpose, our invention provides a simple and inexpensive conduit-retaining member which can readily be placed into position after the conduits have been disposed with their ends entering the outlet box and which can easily be secured in operative position by a workman above the temporary form.

Still further and also more detailed objects will appear from the following specification and from the accompanying drawings, in which Fig. 1 is a plan view of a retaining member suitable for use with a standard type of ceiling outlet box in employing our invention.

Fig. 2 is a vertical section, taken along the line 2—2 of Fig. 3 through such a retaining member and through a ceiling outlet box and a form member in connection with which this retaining member is employed for holding conduits in proper relation to the outlet box.

Fig. 3 is a plan view of the same assembly, taken from the line 3—3 in Fig. 2.

Fig. 4 is a vertical section of a concrete floor and the form members for this floor, showing our holding plates associated with conduits imbedded in the concrete.

In the several views the conduit-retaining member, shown alone in Fig. 1, consists of a rectangular and flat piece of metal 2 bent twice at right angles at each of its ends to produce feet or fastening lugs 3 and 4 and elevating portions 5 and 6 connecting said feet with the body 2 of the plate and providing a space 7 (Fig. 2) for the outlet box 8. The latter has the usual series of circular weakened portions or knockout holes 9, 10, 11 and 12 adapted to receive conduit pipes 13, 14, 15 and 16, and it has also the usual central hole 17 to receive a fixture stud upon which the fixture is hung. The knockout box 8 is, in concrete construction, usually fastened by means of nails 18 to a piece of timber or scantling 19 laid upon "false work" or temporary flooring 20 supported on temporary pillars 21, 22 and 23 (Fig. 4) all of which is removed after the concrete structure has set, thereby exposing and giving ready access to the interior of the outlet box 8 and the threaded ends 24 of the conduits 13 to 16.

In installing such a ceiling outlet box, it has heretofore been customary to position the box temporarily on the form member 19 and to dispose the conduits with their free ends extending downwardly as shown in Fig. 2 and with the usual lock nuts 32 on these conduits engaging the top of the upper wall (or cup-bottom) of the outlet box, after which each conduit was anchored to this box wall by attaching a bushing to the threaded free end of each conduit so as to clamp the said wall between the bushings and the locknuts on the conduits. To secure access to the interior of the box for this purpose, the conduits must be lifted with the box, thus requiring one man for the lifting while another reaches under the box to attach the bushings. If reinforcing rods have already been placed in position above or near the box, both the lifting effort and the difficulty of getting access to the interior of the box are increased, thereby also adding to the time required for securing the conduits to the outlet box in this customary manner.

To obviate these difficulties and to reduce both the labor and the time of installation, we employ a retaining member such as that shown in Fig. 1, which is desirably made of stiff metal with the medial plate portion connected to the feet 3 and 5 of this member by legs 41 sufficiently taller than the peripheral wall of the outlet box so that the vertical distance between the top of the outlet box and the bottom of the medial plate portion 40 of the retaining member will correspond approximately to the standard thickness of the locknuts 32 on the conduits. I also desirably make this medial portion 40 considerably wider than the spacing between conduits transversely of the retaining member and provide this medial portion with lateral recesses (numbered 28 to 31 inclusive in Fig. 1).

Each of these notches is preferably of a width slightly larger than the outside diameter of one of the conduits and hence considerably smaller than the diameter of one of the locknuts, thereby permitting a considerable portion of the upper face of each locknut to be engaged by the retaining member to resist a lifting of the conduit on which the locknut is threaded.

With the retaining member thus laterally notched or recessed, the medial portion of this member can readily be slipped down between the conduits, after which the feet 3 and 4 of this member are secured to the adjacent form member 19 by nails 34 driven through perforations 33 in the said feet. In practice, the legs 41 of the retaining member may be so short that at least one of the feet will be held off the adjacent form member when the retaining member is nailed to the form member, as shown for the right-hand foot 4 in Fig. 2, thereby causing one or more of the locknuts to be clamped between the retaining member and the upper (or cup-bottom) wall of the outlet box, as shown for the left-hand locknut in the same figure. However, even if the retaining member does not effect such a clamping of the locknuts, but has its medial portion raised somewhat above one or more of the locknuts (as shown by the space above the right-hand locknut in Fig. 2) the retaining member will only permit a correspondingly slight lifting of the corresponding conduit and will still prevent a retracting of the conduit from the outlet box. Hence our invention will be equally operative in spite of a fair range of variations in the heights of the outlet boxes or thicknesses of the locknuts.

Since our retaining member can readily be formed from a simple piece of sheet metal, which in the illustrated type is substantially rectangular, this can be quite cheaply made. And, since it requires no lifting of the box, a single workman can easily and quickly install it.

Moreover, the outlet box can be initially positioned in its precise desired location by driving nails 18 through it into the adjacent form member, as shown in Fig. 2. On the other hand, these nails might be omitted, as the recesses in the retaining member will cooperate with the nails 34 in suitably positioning the outlet box when the feet of the retaining member are secured to the adjacent form member by the nails 34. Since these nails extend vertically, the form member 19 can readily be pulled off the nails after the concrete has set.

Outlet boxes of this class usually have at least two knockout holes in the box top (such as the perforations 9, 10, 11 and 12) through which conduits can extend downwardly into the interior of this box. These perforations are customarily spaced from each other and symmetrically disposed with respect to a perforation 17 in the box top, so that our anchoring member when extending between any two of the conduit receiving perforations will also extend over the auxiliary perforation 17. Hence we desirably also utilize our anchoring member for supporting a threaded fixture stud 39 which is fastened to the medial plate portion 40 at such a point that the fixture stud extends downwardly through the auxiliary perforation 17 into the outlet box.

However, while we have illustrated and described our invention in an embodiment in which integral legs and feet are interposed respectively between the two ends of the medial (or locknut-engaging) portion 40 of the retaining member and the attaching nails 34, and in which this portion has two pairs of opposed recesses in its longitudinal edges, we do not wish to be limited to these or other details of the construction, arrangement and use as above disclosed. Obviously many changes might be made without departing either from the spirit of our invention or from the appended claims, and our invention obviously will operate equally well regardless of the number of conduits associated with the outlet box. Moreover, it will be understood that the locknuts on the conduits simply serve as laterally projecting flange portions of these ducts which afford shoulders having faces directed away from the outlet box.

We claim as our invention:

1. The combination with a cup-shaped outlet box bearing at its mouth against a concrete form member, of ducts extending into the box through the cup-bottom thereof and each provided with a lateral projection having its inner face engaging the said bottom to limit the entry of the ducts into the box, a rigid retaining member engaging the outer faces of the said projections and having portions projecting at opposite sides of the box beyond the box, and fastening members extending through the said portions and into the form member for securing the retaining member rigidly to the form members.

2. The combination with a cup-shaped outlet box bearing at its mouth against a concrete form member and having a perforate bottom, of conduits extending through the perforations in the said box bottom; and means for clamping the conduits to the said bottom; the said means including nuts respectively threaded on the several conduits and all engaging the outer face of the said bottom; and a rigid retaining member having perforated end portions engaging the form member and adapted to be secured to the form member independent of the outlet box, the retaining member having a medial portion disposed to be engaged by the outer faces of the nuts to prevent material movement of the nuts away from the said bottom.

3. The combination with a cup-shaped outlet box bearing at its mouth against a concrete form member and having a perforate bottom, of conduits extending through the perforations in the said bottom; nuts respectively threaded on the several conduits and all engaging the outer face of the said bottom; and a rigid retaining member engaging the outer face of the several nuts, the retaining member having legs extending alongside the box and adapted to be secured directly to the form member so as to clamp the nuts against the box and the box against the form member.

4. The combination with a cup-shaped outlet box bearing at its mouth against a concrete form member and having its cup-bottom provided with a plurality of perforations, of conduits having their ends extending into the outlet box respectively through the said perforations, and means for preventing a retraction of the conduit ends from the outlet box; the said means including nuts respectively threaded on the several conduits and all engaging the outer face of the said bottom; and a single stiff retaining member engaging the outer faces of the several nuts; the retaining member comprising a medial portion provided with lateral recesses through which the respective conduits extend and having portions adjacent to the recesses bearing respectively against the outer faces of the said nuts, and legs extending along the outer sides of the box toward the form member and adapted to be secured direct to the form member.

5. The combination with a substantially cup-shaped outlet box having perforations in its bottom, and a concrete form member bearing against the mouth of the box, of conduits extending into the box respectively through the said perforations, nuts threaded respectively on the several conduits and all engaging the outer face of the said box bottom; and a retaining member comprising a medial portion bearing against the outer face of the nuts and provided with lateral recesses through which the respective conduits extend, and legs extending alongside the box, each leg having a foot engaging the form member and adapted to be secured directly to the latter; the width of each recess being less than the diameter of the adjacent nut and larger in diameter than the adjacent conduit, so as to permit the retaining member to be placed in position after the conduits have already been extended into the outlet box.

6. The combination with a concrete form member, of a cup-shaped outlet box disposed with its mouth against the form member and having inlet openings in its bottom, conduits extending into the outlet box through the said openings, nuts respectively threaded on the conduits and all engaging the outer face of the said bottom, and a retaining member; the retaining member comprising a medial portion engaging the outer faces of the nuts and provided with openings corresponding in spacing to the said inlet apertures, legs spaced by a distance greater than the diameter of the box and extending transversely of the said medial portion, feet at the free ends of the legs and disposed in a plane substantially parallel to the medial portion, each leg having its effective height greater than that of the lateral box wall by a distance approximately the height of the nuts used on conduits of a size suitable for entering the said inlet apertures.

7. The combination with an outlet box resting upon a concrete form member, of wire ducts extending into the box through the upper wall of the outlet box, each duct having a projection engaging the top of the said upper wall, a single rigid retaining member extending over the top of the outlet box between the ducts and engaging the upper faces of all of the said projections, and fastening members driven vertically downward through spaced portions of the retaining member and into the form member for securing the retaining member in its said disposition with respect to the said projections.

8. A retaining member for use in connection with a concrete form member in the installing of a cup-shaped outlet box bearing at its mouth against the form member and provided in its cup bottom with perforations, and in connection with the installing of ducts entering respectively through the said perforations and each having a lateral projection engaging the outer face of the bottom of the cup-shaped outlet box; the retaining member comprising a plate bearing against the outer faces of the said projections and having in its lateral edges notches alining with the said perforations and through which openings the duct portions outward of the said projections extend, the said alining of the plate openings with the perforations in the box permitting the retaining member to be placed in its said position after the outlet box and the ducts have been positioned as thus recited, the retaining member having end portions projecting beyond the outlet box and adapted to be secured to the form member.

9. The method of installing a ceiling outlet box and lock-nut carrying conduits associated therewith prior to the imbedding thereof in concrete poured upon a temporary form member, which consists in securing the outlet box to the form member, positioning the conduits with their ends extending through the top of the outlet box and with the lock-nuts engaging the said top, disposing a rigid retaining member in engagement with the tops of all of the lock-nuts, and securing the retaining member to the form member to cause the retaining member to clamp the lock-nuts against the top of the box and to clamp the box against the form member by pressure exerted through the lock-nuts.

10. The method of installing an outlet box in connection with a concrete form member and a conduit having a flange spaced from its free end, which comprises the steps of placing the conduit box in position against the form member, disposing the conduit so that its said free end extends into the outlet box and so that the flange engages the outer face of the wall of the box, disposing a rigid retaining member with a portion thereof adjacent to the outer face of the flange and with other portions thereof engaging the form member, and securing the said other portions to the form member.

11. The combination with a ceiling outlet box having spaced perforations in its top, of conduits extending downwardly into the box respectively through the said perforations, nuts disposed above the said box top and each threaded upon one of the conduits, and a single retaining member above and adjacent to the said nuts, the retaining member having arcuate portions each extending part way around one of the conduits to present a considerable face toward the nuts and to permit the bore of the arcuate portions to center the retaining member with respect to the conduits.

12. The combination with a ceiling outlet box having spaced perforations in its top, of conduits extending downwardly into the box respectively through the said perforations, nuts above and adjacent to the said box top and each threaded upon one of the conduits, a single retaining member disposed above all of the nuts and having arcuate portions each adjacent to and extending part way around one of the conduits, and a fixture stud carried by the retaining member and extending downwardly into the conduit box.

13. The combination with a ceiling outlet box having its top provided with four perforations whose centers are substantially at the corners of an imaginary rectangle, of conduits extending downwards respectively through the said perforations into the box, locknuts seated on the said box top and each threaded upon one of the conduits, and a single retaining member disposed above the box and having at each side thereof two arcuate recesses each straddling a portion of one of the conduits and each overhanging one of the nuts.

14. A combination as per claim 13, in which the said box top also has a fifth perforation substantially central with respect to the said four perforations; in combination with a fixture stud supported by and depending from the retaining member and extending downwardly through the said fifth perforation.

15. The combination with a ceiling outlet box having spaced perforations in its top, of conduits extending downwardly into the box respectively through the said perforations, nuts seated on the said box top and each threaded upon one of the conduits, a single retaining member having edge portions each overhanging a part of one of the nuts and each extending part way around one of the conduits, and means operatively securing the conduit box to the retaining member so as to clamp the said nuts therebetween.

16. The combination with a downwardly open cup-shaped ceiling outlet box having its cup bottom provided with three perforations, of two conduits extending respectively through two of the said perforations, two locknuts above the box and adjacent to the said cup bottom, each locknut being threaded on one of the conduits, a single retaining member disposed outside the box and extending over the third perforation and overhanging portions of the said locknuts, and a fixture stud supported by the retaining member and extending downwardly through the said third perforation.

In testimony whereof we have hereunto signed our names.

ALBERT UHL.
PETER E. BRICKIE.